July 26, 1949. H. F. MacMILLIN 2,477,258
TURRET INJECTION MACHINE
Filed July 1, 1944 6 Sheets-Sheet 2

INVENTOR
HOWARD F. MacMILLIN
BY
Toulmin + Toulmin
ATTORNEYS

July 26, 1949. H. F. MacMILLIN 2,477,258
TURRET INJECTION MACHINE
Filed July 1, 1944 6 Sheets-Sheet 4

INVENTOR
HOWARD F. MacMILLIN,
BY
Toulmin & Toulmin.
ATTORNEYS

July 26, 1949.   H. F. MacMILLIN   2,477,258
TURRET INJECTION MACHINE
Filed July 1, 1944   6 Sheets-Sheet 5

INVENTOR
HOWARD F. MacMILLIN,
BY
Toulmin + Toulmin
ATTORNEYS

July 26, 1949.                    H. F. MacMILLIN                    2,477,258
                                TURRET INJECTION MACHINE
Filed July 1, 1944                                              6 Sheets-Sheet 6

INVENTOR
HOWARD F. MacMILLIN,
BY
Toulmin & Toulmin
ATTORNEYS

Patented July 26, 1949

2,477,258

UNITED STATES PATENT OFFICE 2,477,258

TURRET INJECTION MACHINE

Howard F. MacMillin, Mount Gilead, Ohio, assignor to H-P-M Development Corporation, Wilmington, Del., a corporation of Delaware Application July 1, 1944, Serial No. 543,147

27 Claims. (Cl. 18—30)

This invention relates to injection machines for injecting plastic materials.

An object of the invention is to provide an injection machine wherein the plastic material is fed in measured charges into a precompression chamber for forming pellets of plastic material that are subsequently transferred to a turret and carried through a heating station and thence to an injection station wherein the heated plastic pellet is removed from the turret and transferred to an injection chamber for ejection therefrom by an injection plunger.

Another object of the invention is to provide a plastic injection machine for compressing plastic material into the form of pellets and ejecting the plastic material from an injection chamber after being suitably heated at an intermediate station, which machine includes a turret for carrying the plastic pellet from the precompressing station to the injection station and wherein the pressure developed on the plastic material for precompressing and ejecting the same is carried out in chambers separate from the turret so that the turret is not required to be constructed to withstand high pressures.

Another object of the invention is to provide an injection machine wherein plastic material is heated in chambers carried in a turret by means of high frequency energy, which heated material can be subsequently moved to an injection station immediately after being heated for ejection from an injection chamber.

Still another object of the invention is to provide an injection machine in accordance with the foregoing object wherein the turret can be constructed of electrical insulating materials to permit heating of the plastic material in the chambers in the turret, the chambers in the turret also being constructed of electrical insulating material.

Still another object of the invention is to provide an injection machine in accordance with the two foregoing objects wherein the plastic material is pre-compressed into pellet form in a chamber separate from the turret and is ejected from an injection chamber that is separate from the turret so that the electrical insulating materials from which the turret is constructed are not required to withstand high pressures.

Still another object of the invention is to provide an injection machine having a turret for conveying plastic material from a loading station to a heating station, and subsequently to an injection station wherein the plastic material is heated while disposed in the turret for subsequent transmittal to an injection station and ejection therefrom.

Still another object of the invention is to provide an injection machine in accordance with the foregoing objects wherein the turret may be constructed from plastic materials.

Still another object of the invention is to provide an injection machine in accordance with any of the foregoing objects wherein the operations of pre-compressing plastic material and heating plastic material are performed substantially concomitantly from separate stations, and the operations of placing a pre-compressed charge of plastic material into the turret and ejecting a heated charge of plastic material are performed at independent stations substantially concomitantly but alternately with the first-mentioned operations.

A further object of the invention is to provide a plastic injection machine in accordance with the foregoing objects wherein the various operations performed by the machine are carried out automatically by a suitable control system.

Further objects and advantages will become apparent from the drawings and the following description.

In this invention, the injection machine as illustrated in Figures 1 to 6 inclusive, consists of a bed 10 having a bolster 11 secured thereto that carries a stationary die 12. A movable die 13 co-operates with the die 12 so that suitable mold cavities can be provided therebetween. The movable die 13 is carried upon the die plate 14 supported on the ram 15 that is reciprocated by the hydraulic motor 16. Strain-rods 17 extend between the bolster 18, that supports the hydraulic motor 16, and the bolster 11 whereby to receive the force of holding the dies 12 and 13 together. The die plate 14 is slidable upon the strain-rods 17 for guiding movement thereof.

Figure 1:
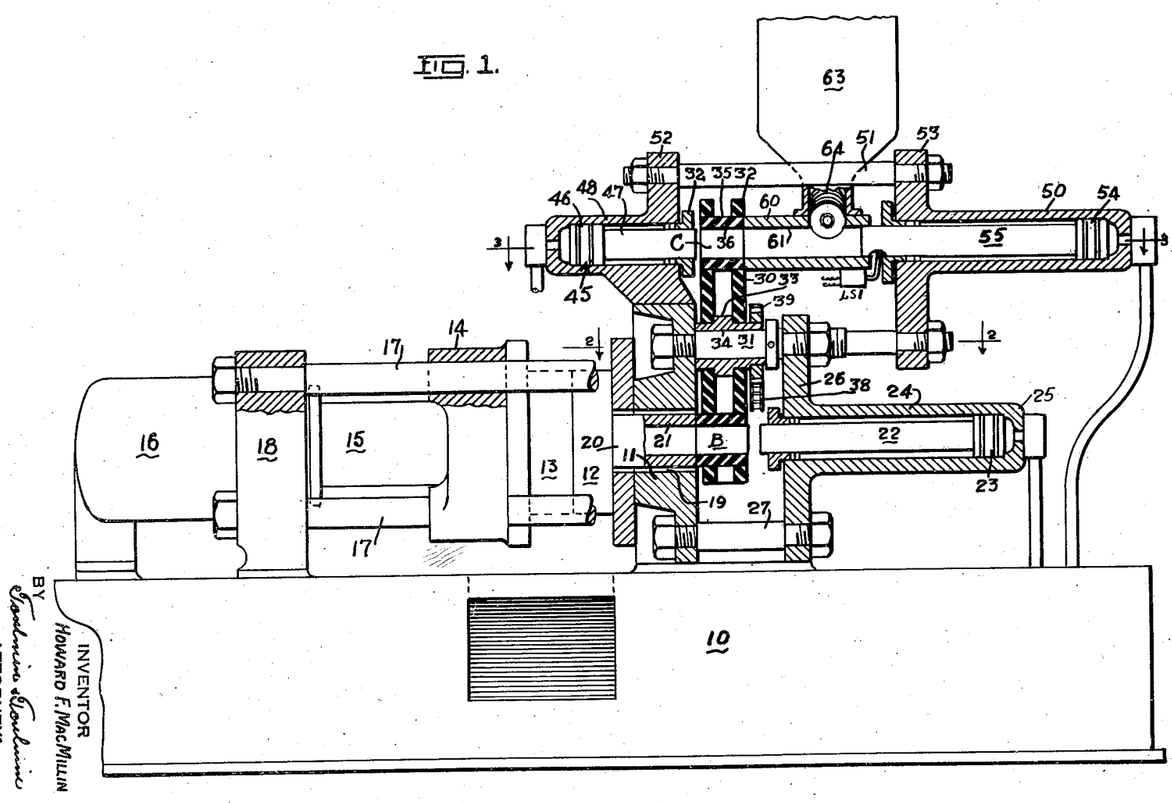
Figure 1 is, in general, a vertical cross-sectional view of the apparatus of this invention, but a part of the mechanism is shown in elevation.

The bolster 11 has an opening 19 therein that receives an injection chamber 20 having the internal cylinder bore 21. The injection chamber 20 is suitably secured to the bolster 11.

An injection plunger 22 has a piston-head 23 on one end thereof that reciprocates in the cylinder 24 whereby to provide a hydraulic motor 25 for reciprocating the plunger 22 within the injection cylinder in a manner hereinafter described. The cylinder 24 has a flange 26 that is engaged by the strain-rods 27 to thereby support the hydraulic motor 25 from the bolster 11.

A turret 30 is rotatably mounted upon the supporting shaft 31 carried between the bolster 11 and the flange 26 on the hydraulic motor 25, thus placing the turret 30 between the injection chamber 20 and the hydraulic motor 25 so that the injection plunger 22 must pass through the turret 30 before entering the injection cylinder bore 21.

The turret 30 is preferably constructed from a pair of side plates 32 that are spaced from one another by the shoulder 33 provided on the pivot bushing bearing 34 of the turret 30. The side plates 32 are provided with a plurality of chambers 35 positioned therebetween and spaced equidistantly around the turret 30 so that a chamber 35 is positioned every 90 degrees around the turret.

Figures 3, 4, 17:
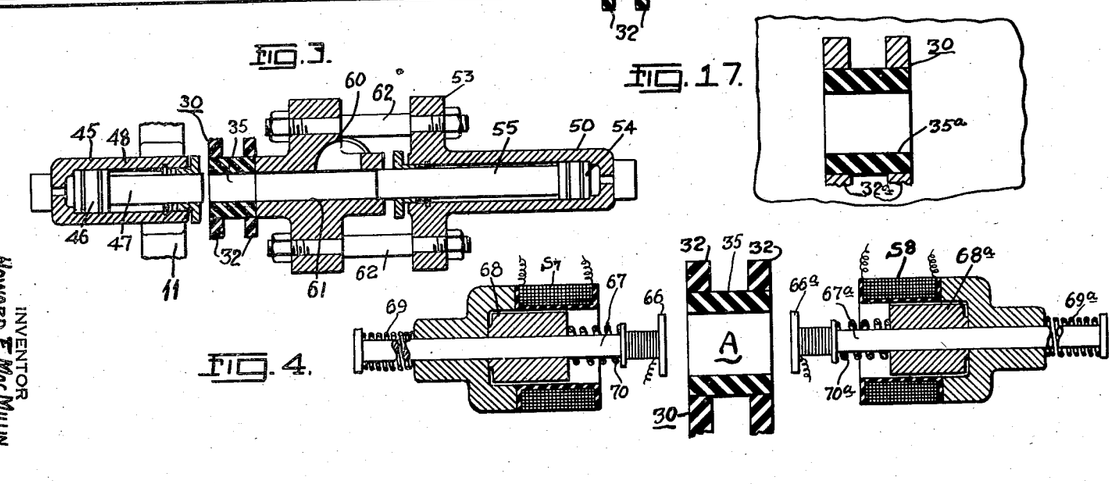
Figure 3 is a horizontal cross-sectional view through the pre-compressing mechanism of the apparatus as taken along line 3—3 of Figure 1.
Figure 4 is an enlarged cross-sectional view illustrating the arrangement of the high frequency heating apparatus for the plastic material that is carried in the chambers of the turret.
Figure 17 is a cross-sectional view of the turret of the injection machine showing an arrangement thereof that is a modified structure from that disclosed in Figures 1 and 4.

The side plates 32 that form the walls of the turret are preferably constructed from electrical insulating material, and can be of plastic material, because as hereinafter described, the turret is not required to withstand any pressure relative to the operating conditions of the machine. Also, the turret chambers 35 are constructed of electrical insulating material, and can be of plastic material, for the foregoing reason. Also, it is preferable to construct the side plates 32 and the chambers 35 of electrical insulating material because the plastic material that is contained within the bore of the chambers 35 is to be heated by the use of high frequency energy in a manner hereinafter described. However, it is not to be considered that plastic materials alone are used in the construction of the turret 30, but rather metals can be used regardless of the type of heating that is applied upon the plastic material in the turret chambers 35, including the use of high frequency energy. Also, as illustrated in Figure 17, the turret 30 may be constructed with metal side plates 32a which carry the chambers 35a constructed from electrical insulating or plastic material such as "Styrene" which will not heat when in the influence of high frequency energy and which may be of sufficient strength to withstand high pressures to permit compressing plastic material therein and ejecting the same therefrom. The metal walls of the turret 30 are preferably grounded relative to the circuit from the high frequency generator whereby the intensity of the field of high frequency energy within the material-receiving chamber 35 is increased because the body of grounded metal in the turret prevents stray radiation of the high frequency energy.

The turret 30 is indexed by an electric motor 40 having a sprocket-wheel on the shaft thereof that drives a sprocket-chain 38 in engagement with the sprocket-wheel 39 provided on the turret bearing bushing 34.

Figure 6:
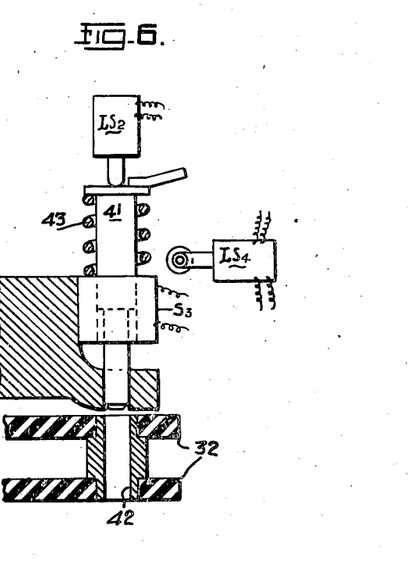
Figure 6 is a cross-sectional view of the indexing latch-bolt mechanism for the turret of the machine taken substantially along line 6—6 of Figure 5.

A bolt-latch mechanism is provided for locating the turret in proper position upon each indexing movement thereof and consists of a solenoid $S_3$ that operates a latching-pin 41 for moving the same into a pin-receiving bushing 42 that is provided between the turret plates 32. A spring 43 retracts the latching-pin 41 from the pin bushing 42 when the solenoid $S_3$ is de-energized.

The turret 30, as rotatably supported upon the pivot shaft 31, is so positioned relative to the injection plunger 22 and the injection cylinder 20 that the turret chambers 35 are positioned in vertical and horizontal arrangements 90 degrees apart when one of the chambers 35 aligns with the injection chamber 20.

Mounted upon the bolster 11 there is provided a cylinder 45 having a piston 46 therein that carries a ram reciprocable through the turret chambers 35 when hydraulic fluid is supplied alternately to opposite sides of the piston 46 in the cylinder 45. A cylinder 50 is supported by the strain-rods 51 between the flange 52 on the cylinder 45 and the flange 53 on the cylinder 50. The cylinder 50 forms a hydraulic motor that has the piston 54 therein reciprocable in the cylinder 50 upon the application of hydraulic fluid to opposite sides of the piston 54. The piston 54 has a ram 55 extending therefrom and reciprocable through the turret chamber 35 in a manner hereinafter described.

A feed chamber 60 is positioned between the turret 30 and the cylinder 50, and has a chamber bore 61 extending through the same through which the ram 55 reciprocates during operation of the apparatus. The feed chamber 60 is supported from the flange 53 of the cylinder 50 by means of the strain-rods 62. A hopper 63 is supported upon the feed chamber 60 and has a suitable feed screw 64 therein that transfers plastic material from the hopper 63 into the feed cylinder 60. The feed screw 64 is driven by an electric motor 65 suitably secured to the hopper 63, and is operated in response to the action of a timing mechanism that times the cycle of operation of the electric motor so as to feed a determined quantity of plastic material from the hopper 63 into the cylinder bore 61.

As shown in Figure 1, the feed cylinder 60 is positioned vertically above the injection cylinder 21, thus it is 180 degrees of rotation from the injection cylinder.

Ninety degrees of rotation from the feed cylinder 60 there is located the apparatus for heating the plastic material in the turret chambers 35 when indexing from the feeding station, or feeding cylinder 60, to the heating station, 90 degrees of rotation from the same.

The apparatus at the heating station of the machine consists of a pair of electrodes 66 and 66a that are connected to a suitable source of high frequency energy. These electrodes 66 and 66a are placed on opposite sides of the turret 30 so as to establish a field of high frequency energy between the electrodes for heating plastic material contained in the turret chamber 35 that is in alignment with the electrodes. The source of high frequency energy may be any suitable high frequency generator capable of producing frequencies in the nature of 9 to 15 kilocycles. Such apparatus is currently available as regular production articles and hence description of such apparatus for producing the high frequency current is not believed necessary.

The electrode plates 66 and 66a are carried upon plungers 67 and 67a that have the armatures 68 and 68a positioned on the same. The armatures 68 and 68a move within the solenoids $S_7$ and $S_8$ respectively when energized to move the electrodes 66 and 66a into engagement with plastic material that is carried in the turret chamber 35. Springs 69 and 69a surround the plungers 67 and 67a to retract the electrodes 66 and 66a when the solenoids $S_7$ and $S_8$ are de-energized. Springs 70 and 70a permit movement between the armatures 68 and 68a and the electrodes 66 and 66a to compensate for any varying quantity of plastic material that may be contained in the turret chamber 35.

Figure 14:
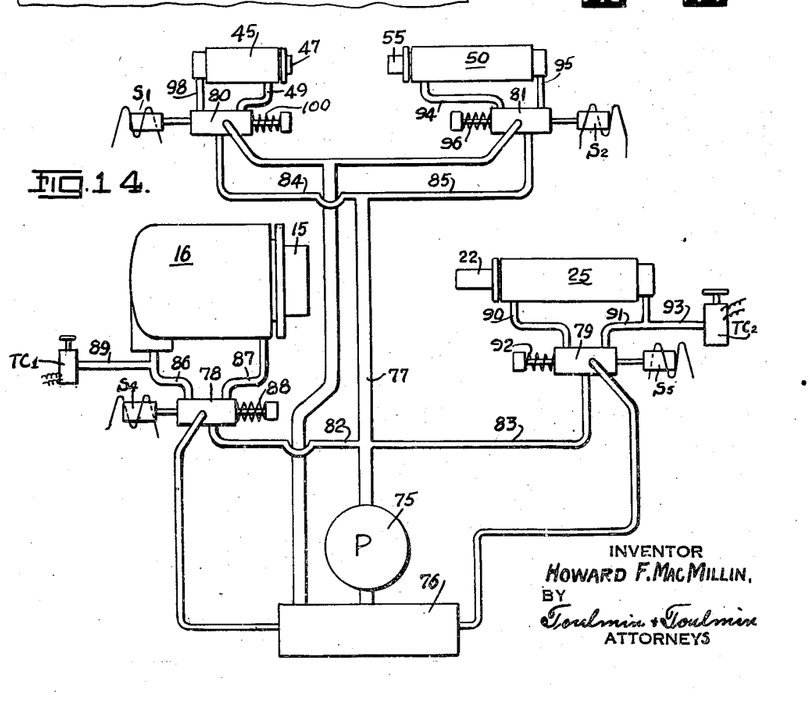
Figure 14 is a diagrammatic view showing a hydraulic system for operating the machine disclosed in Figures 1 and 2.

A hydraulic circuit for operating the various hydraulic motors of the apparatus of this invention is shown in Figure 14. A pump 75 receives fluid from a supply tank 76 and delivers the same into a pressure-line 77. The pressure line 77 is connected to the 4-way valves 78, 79, 80 and 81 by means of the conduits 82, 83, 84 and 85, respectively.

The 4-way valve 78 supplies fluid under pressure to the hydraulic motor 16 through the conduits 86 and 87 alternatively to opposite ends of the hydraulic motor to reciprocate the ram 15, and thus provide pressure for holding the die 13 in engagement with the die 12, or to retract the die 13 from the die 12. The 4-way valve 78 has a spring 88 that moves the valve in one direction, and which spring is opposed by a solenoid $S_4$ to move the valve in the opposite direction. A pressure-responsive electric switch $TC_1$ is connected to the conduit 86 by the pipe 89 whereby to respond to the pressure on the pressing side of the ram 15 to actuate certain elements of the control system in a manner hereinafter described.

The 4-way valve 79 supplies hydraulic fluid under pressure to the hydraulic motor 25 through the conduits 90 and 91 alternately to opposite ends thereof to retract the ram or injection plunger 22. The 4-way valve is provided with a spring 92 to move the same in one direction, and with a solenoid to move the valve in the opposite direction. The pressure-responsive control switch $TC_2$ is connected to the conduit 91 by the pipe 93 to thereby respond to the pressure on the pressing side of the hydraulic motor 25 to operate elements of the control system in a manner hereinafter described.

The 4-way valve 81 supplies fluid under pressure to the hydraulic motor 50 through the conduits 94 and 95 alternately to opposite ends thereof to reciprocate the ram 55. A spring 96 moves the 4-way valve in one direction, and is opposed by a solenoid $S_2$ which moves the valve 81 in the opposite direction.

The 4-way valve 80 supplies hydraulic fluid under pressure to the hydraulic motor 45 through the conduits 98 and 99 alternately to opposite ends of the hydraulic motor to retract the ram 47. A spring 100 moves the 4-way valve in one direction and a solenoid $S_1$ moves the valve 80 in the opposite direction.

The electrical elements referred to in the description of the hydraulic system are all properly interconnected in a suitable control system described hereinafter.

The operation of the apparatus, in general, consists of substantially concomitantly pre-compressing a determined charge of plastic material with heating of a charge of plastic material, and substantially concomitantly ejecting a charge of plastic material from the injection chamber with placing a pre-compressed charge of plastic material into a turret chamber. Thus, the operation of the machine can be divided into two phases wherein the pre-compressing of plastic material and the heating of plastic material constitutes one phase and the injection of plastic material and the moving of a charge of plastic material into the turret chamber constitutes a second phase of operation of the machine.

Figure 5:
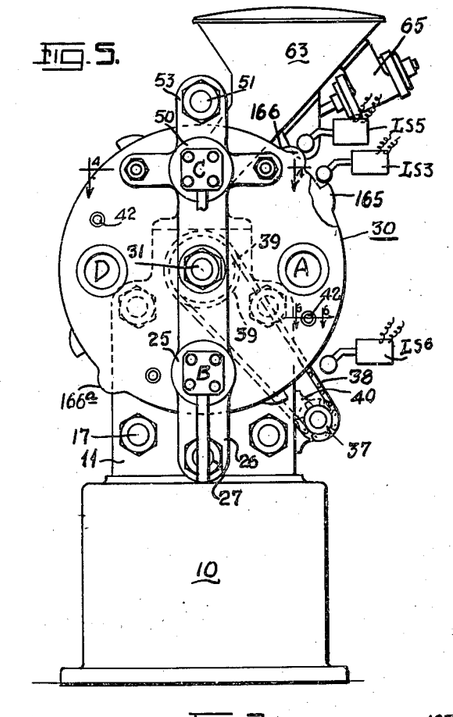
Figure 5 is an end elevational view of the machine of this invention as viewed from the right-hand end of the machine as shown in Figure 1.

Assuming that the machine has been in operation, and the apparatus is in the position as illustrated in Figures 1 and 5, a charge of plastic material will be in the turret chamber 35 at the heating station A, stations B, C and D being empty at this time.

Hydraulic fluid will then be admitted to the left-hand side of the hydraulic motor 45 to advance the plunger 47 through the empty turret chamber 35 at station C, the end of the plunger 47 just entering the feeding chamber 60. Hydraulic fluid is also amitted to the right-hand side of the hydraulic motor 50 to move plastic material that has been previously fed into the cylinder bore 61 of the feed chamber 60 against the plunger 47 to pre-compress the plastic material between the rams 47 and 55 and thereby form a pellet of plastic material. With the hydraulic fluid being admitted to both hydraulic motors 45 and 50 simultaneously, the piston area of the piston 46 will be slightly greater than the area of the piston 54 so that the ram 47 will arrive at its final position before the ram 55 arrives at its final position.

Concomitantly with the pre-compression of the plastic material in the feeding chamber 60, as heretofore described, high frequency current is supplied to the electrodes 66 and 66a that are now in engagement with the plastic material in the turret chamber 35 at station A to thereby heat the plastic material to a suitable temperature for ejection from the injection cylinder 20 when the turret is indexed upon the next operation of the machine. However, before the turret 30 is indexed, hydraulic fluid is supplied to the right-hand side of the hydraulic motor 45 to retract the ram 47 to the position illustrated in Figure 1, and simultaneously therewith pressure is relieved from the right-hand side of the hydraulic motor 50 to prevent any further forward movement of the ram 55 at this time.

The turret 30 is then indexed by operation of the motor 50, the latch-bolt 41 being withdrawn from the latch bushing 42 by operation of the solenoid S3. When the turret begins rotation, the solenoid S3 may be de-energized to permit the latch-bolt to ride upon the surface of the turret 30 and thus permit the same to drop into the next latch bushing 42 that is 90 degrees of rotation away from the same.

When the turret 30 stops its indexing motion, it has rotated 90 degrees, thus placing the heated charge of plastic material, heated at the station A, into alignment with the injection cylinder 20 at the station B.

Hydraulic fluid is then supplied to the right-hand side of the hydraulic motor 25 to advance the injection ram 22 through the turret chamber 35 at station B and thus transfer the heated charge of plastic material from the turret chamber 35 into the injection cylinder 20. The ram 22 continues its forward movement to eject the plastic material from the injection cylinder 20.

Concomitant with supplying hydraulic fluid to the hydraulic motor 25, hydraulic fluid is also supplied to the hydraulic motor 50, on the right-hand end thereof, to again advance the ram 55 to transfer the previously pre-compressed pellet of plastic material from the feeding chamber 60 into the turret chamber 35 at station C.

After the injection ram 22 has completed its forward movement to fill the molds or dies 12 and 13, hydraulic fluid is supplied to the left-hand ends of the hydraulic motors 25 and 50 to retract the rams 22 and 55, respectively, into the positions illustrated in Figure 1.

When the ram 55 is retracted, the motor 65 for the feed screw 64 can be operated for a predetermined time to feed a predetermined quantity of plastic material into the feeding chamber 60. Also, with the ram 22 removed from the turret chamber 35 at station B, the turret 30 can again be indexed 90 degrees so as to place the pellet now retained in the chamber 35 at station C into position for heating at station A, whereupon another charge of plastic material can be pre-compressed in the feeding chamber 60 when the turret stops its indexing motion in the manner heretofore described.

It will thus be seen that the machine of this invention is capable of pre-compressing measured charges of plastic material in a chamber separate from the turret that are subsequently transferred into the turret so that the turret can carry the pre-compressed charge of plastic material through a heating station, wherein it is heated, to an injection station, wherein the heated plastic material is transferred to an injection chamber and ejected therefrom. The turret is therefore at no time subjective to high internal pressures, and therefore can be constructed of relatively light-weight materials, or plastic materials.

Figure 7:
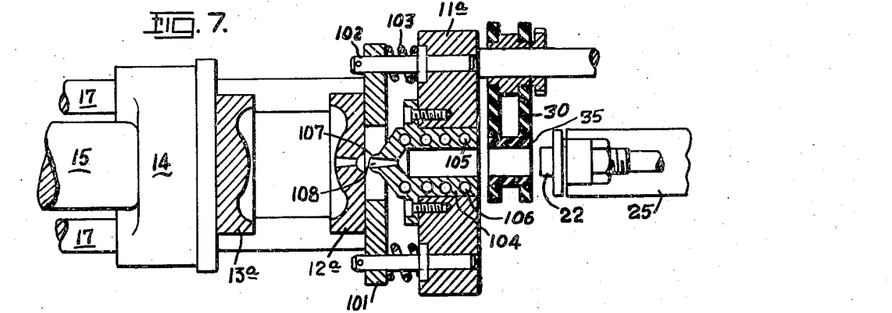
Figure 7 is a horizontal cross-sectional view through a modified structure of the injection chamber that is associated with the turret of the machine.

In Figure 7 there is illustrated a modified structural arrangement between an injection cylinder and a mold-part that is associated therewith, whereby the mold-part can be separated from the injection cylinder when the molds are open to break the sprue between the injection cylinder and the mold and to prevent transfer of heat from the injection cylinder to the mold. In this arrangement, the mold part or die 13a is supported and operated in the same manner as the mold-part or die 13 heretofore described.

The mold-part, or die 12a is carried upon a plate 101 that is supported by the pins 102 extending from the bolster 11a. Springs 103 are positioned between the bolster 11a and the plate 102 to normally position the plate in spaced relationship relative to the bolster 11a.

The bolster 11a carries an injection cylinder 104 that has an injection chamber 105 therein and heating passages 106 surrounding the chamber 105. The forward end of the injection cylinder 104 is provided with an injection nozzle 107 that has a nozzle orifice 108 through which the plastic material is transferred into the mold cavity provided between the mold-parts, or dies 13a and 12a.

When the mold-parts 12a and 13a are open, as illustrated in Figure 7, the mold-part 12a is spaced from the nozzle 107 to thereby prevent heat transfer from the injection cylinder 104 through the nozzle 107 to the mold-part 12a. Also, this separate movement breaks the sprue when the molds are opened.

The turret 30 can be constructed and operated with regard to the remaining parts of the machine illustrated in Figure 1 in the same manner as heretofore described.

Figures 8, 9, 10, 11:
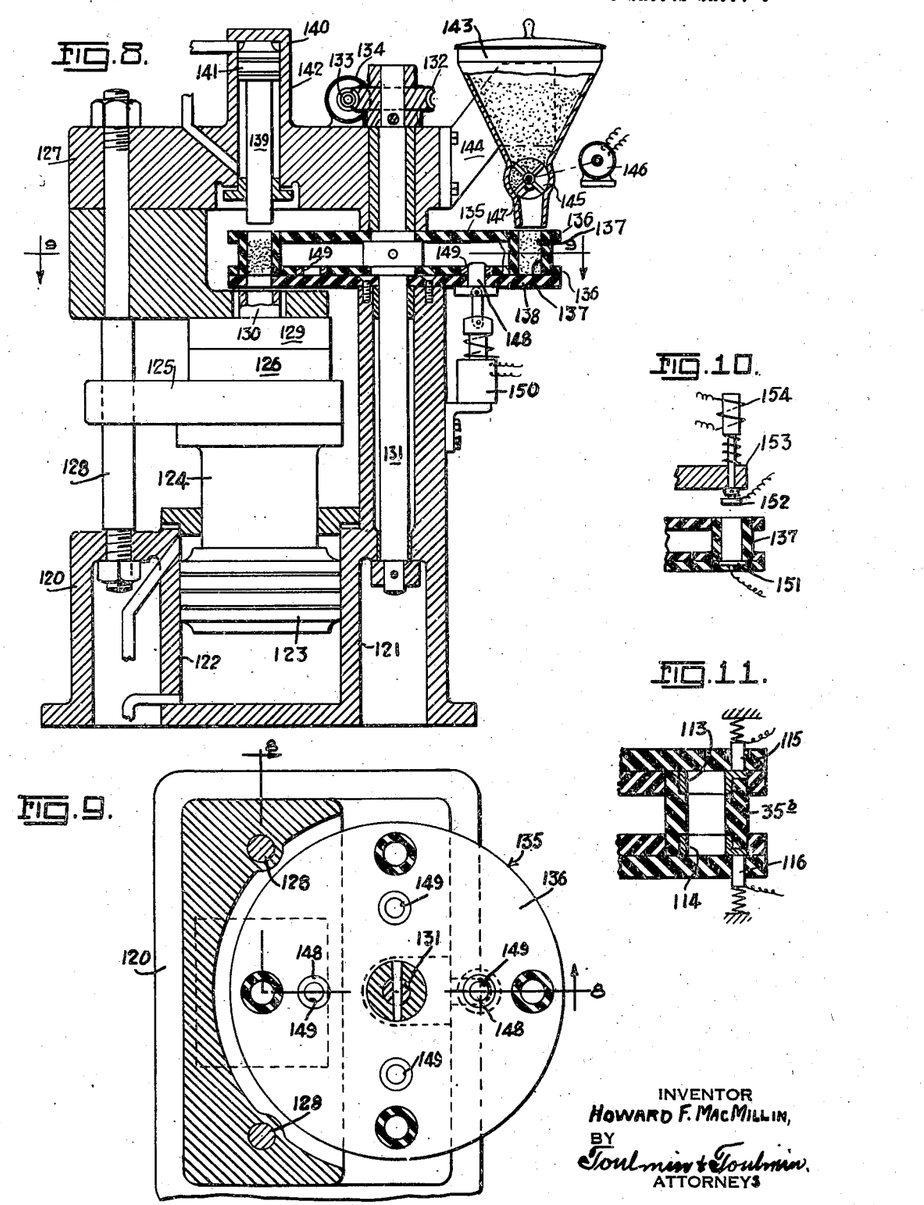
Figure 8 is a vertical cross-sectional view of a modified arrangement of the injection machine taken along line 8—8 of Figure 9.
Figure 9 is a horizontal cross-sectional view of the machine shown in Figure 8 and is taken along line 9—9 of Figure 8.
Figure 10 is a partial cross-sectional view illustrating the association of the electrode elements for heating plastic material contained in the turret chambers.
Figure 11 is a partial cross-sectional view of the turret of the apparatus shown in Figure 12 illustrating a modified electrode arrangement for heating plastic material in the turret chambers.
Figures 12, 13:
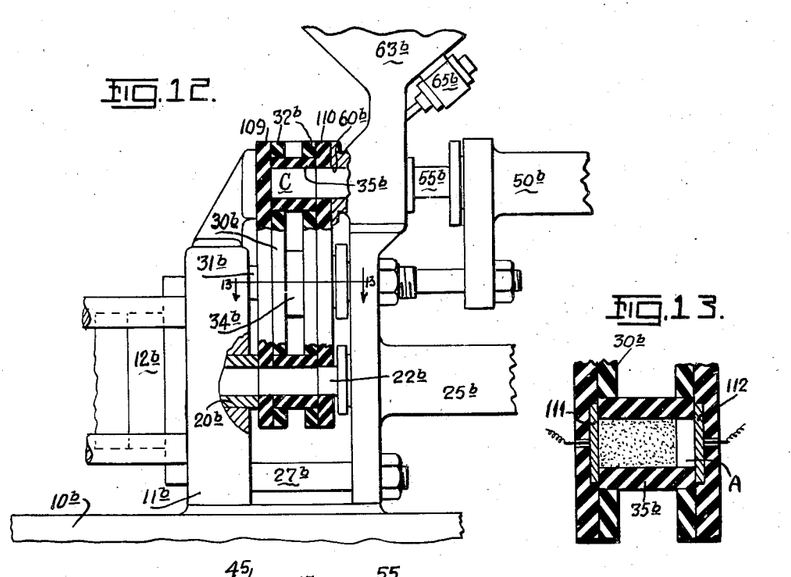
Figure 12 is a side-view of a modified arrangement of apparatus relative to the manner in which the turret is associated with the other elements of the machine.
Figure 13 is a cross-sectional view of a part of the turret illustrated in Figure 12 showing the positioning of the electrodes for heating the plastic material in the turret chambers.

In Figures 11, 12 and 13 there is illustrated a slightly modified arrangement of the machine of this invention wherein the chambers in the turret are adapted to receive molding powder without first pre-compressing the same so that the molding powder can be carried from the feeding station through a heating station to an injection station.

In the arrangement shown more specifically in Figure 12, the apparatus consists of a bolster 11b carried by the frame 10b. An injection cylinder 20b is carried in the bolster 11b and co-operates with a mold or die 12b. A turret 30b is rotatably mounted above the injection cylinder 20b upon the support shaft 31b, and consists of the turret plates 32b and a plurality of individual turret chambers 35b, all in the same manner as heretofore described.

A hydraulic motor 25b having a ram 22b is associated with the turret 30b as is the hydraulic motor 50b having the ram 55b for respectively ejecting plastic material from the injection cylinder 20b and for transferring plastic material from the feeding chamber 60b into the turret chamber 35b in the same manner as heretofore described.

The plates 109 and 110 are positioned adjacent opposite faces of the turret 30 to engage the turret plates 32b, whereby the turret rotates between the plates 109 and 110 in constant engagement therewith. The plate 110 is provided with an opening therein which aligns with the feed chamber 60 to permit transfer of plastic material from the feed chamber 60 into a turret chamber 35 when in alignment with the feed chamber 60. The plates 109 and 110 are provided with suitable openings therein which align with the injection ram 22b to permit it to pass through the turret and enter the injection cylinder 20b for ejecting plastic material from the injection cylinder after transferring the plastic material from the turret into the injection cylinder. There are no other openings provided in the plates 109 and 110, thus when powdered or granular plastic material is fed from the hopper 63b into the feed chamber 60b by the motor 65b, the powdered or granular plastic material being subsequently transferred into turret chamber 35b, the powdered or granular plastic material can then be carried by the turret between the plates 109 and 110 from the feeding station C through the heating station A and to the injection station C in the manner as heretofore described.

At the heating station A, the electrode plates are preferably imbedded in the plates 109 and 110. The plastic material in the turret chamber 35b is thus carried between the electrode plates 111 and 112 for heating by the high frequency field established between the electrode plates that are suitably connected to a high frequency generating unit.

The plates 109 and 110 are preferably constructed of electrical insulating material, or plastic material, or the portion thereof that receives the electrode plates 111 and 112 may be electrically insulated from the remaining portion of the plates 109 and 110.

As a further modified arrangement of the manner of applying the high frequency field to the plastic material contained in the turret chamber 35b, Figure 11 discloses an arrangement wherein the electrodes 113 and 114 are in the form of rings inserted in the end walls of the turret chambers 35b. These electrode rings 113, 114 are engaged by spring-pressed contactors 115, 116 when the turret chambers 35b are disposed in position at the heating station A.

In Figures 8 and 9 there is illustrated a modified arrangement of the injection machine of this invention wherein the turret is disposed horizontally and measured charges of plastic material can be fed into the turret chambers through the open ends thereof.

The machine consists of a bed 120 having a cylinder 121 formed therein to provide a cylinder chamber 122 that receives a piston 123 for thereby forming a hydraulic motor. The piston 123 has a ram 124 extending from the cylinder 121 that supports a mold-carrying plate 125 which in turn carries a mold-part 126.

The head 127 of the injection machine is suitably connected to the bed 120 by means of strain-rods 128, some of the strain-rods extending through the mold-carrying plate 125 to guide the same upon movement thereof. A stationary mold-part 129 is carried upon the head of the machine 127, and an injection cylinder 130 is secured to the head 127.

A turret 135 is mounted upon the shaft 131 that is suitably journaled in the bed 120 and the head 127 of the injection machine. The shaft 131 carries a worm wheel 132 on the upper end thereof that is driven by a worm 133 carried upon the shaft of the electric motor 134 to thereby rotate the turret 135.

The turret 135 consists of the two side-plates 136 that receive turret chambers 137 positioned therebetween for holding charges of plastic material. These turret chambers 137 are spaced about the turret 135 in the same manner as heretofore described with regard to the turret 30 illustrated in Figure 1. The turret 135 engages a plate 138 to retain the charges of granular or powdered plastic material in the turret chambers 137 when moving the same from the feeding station to the injection station.

A hydraulic motor 140 has a piston 141 reciprocating in the cylinder 142 and to which the injection ram 139 is attached, which reciprocates through the turret chambers 137 to transfer plastic material from the same into the injection cylinder 130 and to eject plastic material therefrom.

A feed hopper 143 is secured to the head 127 by the bracket 144, and has a feed-wheel 145 therein driven by an electric motor 146. The electric motor 146 is controlled by suitable controlling devices to rotate the feed-wheel in such a manner as to empty only one section of the feed-wheel at a time, the sections of the feed-wheel being provided by the partition members 147.

The turret 135 is positioned, after an indexing motion, by the latch-bolt 148 that enters the bushings 149 after each indexing motion. The latch-bolt 148 is controlled by a solenoid 150 which withdraws the latch-bolt from the turret when energized.

The turret 135 is provided with a feeding station, and a heating station and an injection station similar to the arrangement disclosed with regard to the turret 30 shown and described in Figure 1. The heating station for the turret 135 includes an electrode member 151 that may be imbedded in the plate 138. A second electrode 152 is carried upon the end of a plunger 153 actuated by a solenoid 154 to cause the electrode 152 to enter the turret chamber 137 when the solenoid 154 is energized. The electrodes 151, 152 are connected to a suitable source of high frequency current for producing a field of high frequency energy between the electrodes, and thus heating the plastic material in the turret chamber 137.

Figure 2:
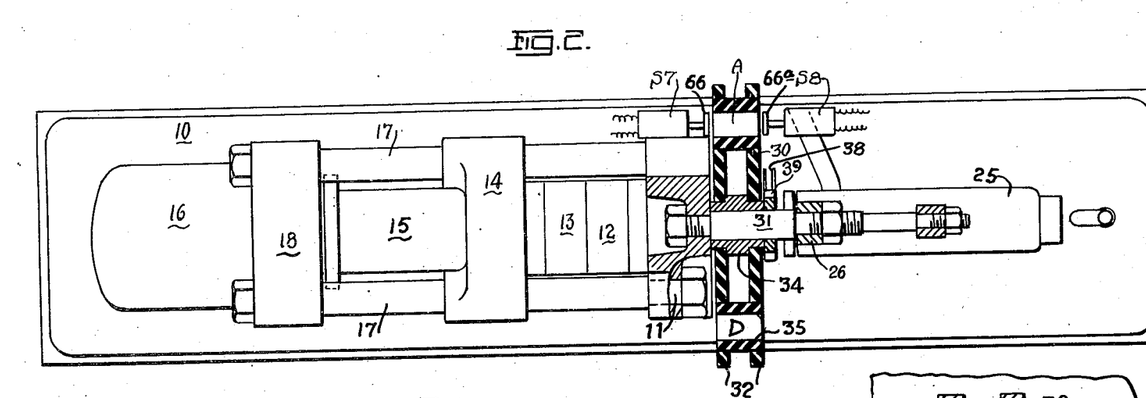
Figure 2 is a plan view of the apparatus shown in Figure 1 with a portion thereof shown in cross-section as taken along line 2—2 of Figure 1.

The operation of the apparatus shown in Figures 8 and 9 is similar in all respects to the operation of the apparatus disclosed in Figures 1 and 2 with the exception that the pre-compression operation of the plastic material is dispensed with and the plastic material is thus retained in the turret chambers 137 in a powdered or granular form during the cycle of operation of the machine.

Figure 15:
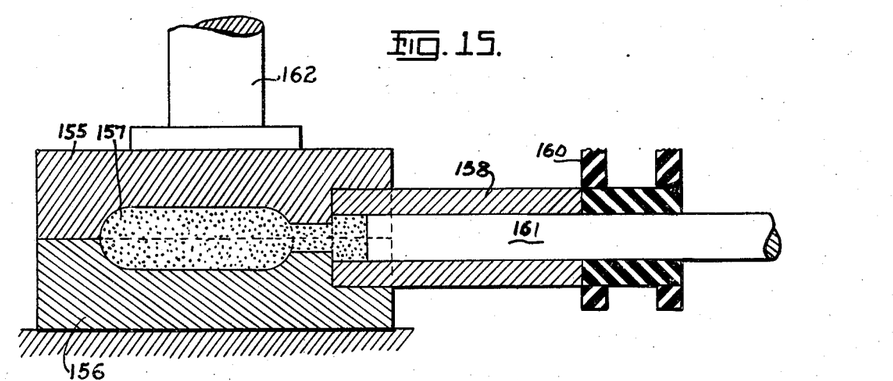
Figure 15 is a cross-sectional view showing a modified arrangement of the injection chamber of the injection machine.

Figure 15 illustrates a modified arrangement of the injection apparatus wherein the mold-parts 155 and 156 co-operate to form a mold cavity 157. An injection cylinder 158 has the end thereof inserted between the mold-parts 155 and 156 along the parting-line 159 thereof.

The turret 160 previously described is disposed adjacent the injection cylinder 158. An injection plunger 161 passes through the turret 160 to transfer pastic material from the turret into the injection cylinder 158 and to eject the plastic material from the injection cylinder. A mold-clamping ram 162 retains the mold-parts 155 and 156 together during the injection operation.

The electric controls for operating the injection machine illustrated in Figures 1 to 6, inclusive, consists of the aforementioned electric controls described when referring to the detailed description of the machine, and in addition consists of the limit switch LS3 engaged by the cam 165 on the turret 30 just before the turret completes its indexing motion, and the limit switches LS5 and LS6 that are alternately engaged by the cams 166 on the turret 30 upon each 90 degrees of rotation of the turret to select the cycle of operation of the machine in a manner hereinafter described. In addition, there is provided a limit switch $LS_1$ engaged by the ram 55 of the hydraulic motor 50 when it is in full retracted position.

Figure 16:
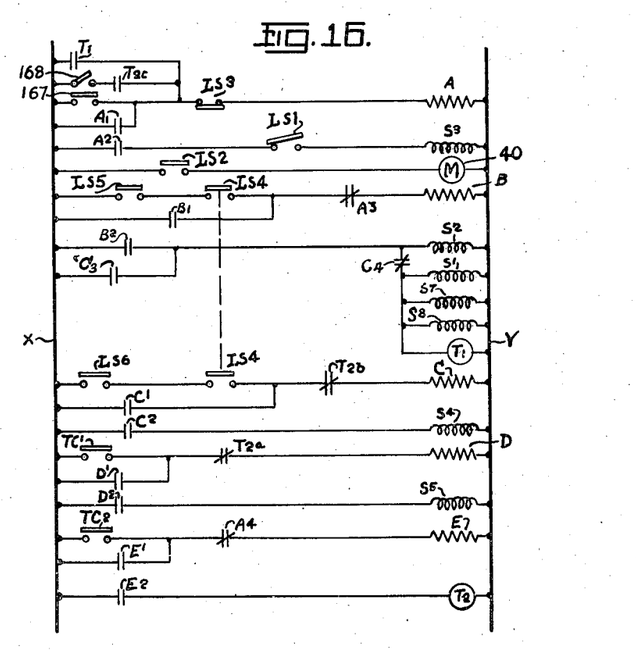
Figure 16 is a simplified schematic wiring diagram of the control system for operating the injection machine automatically.

Figure 16 illustrates a schematic wiring diagram for electrically interconnecting the various control elements for the machine, all of which devices are connected to the power lines X and Y. To start the operation of the machine the starting switch 167 is closed, which causes energization of a contactor A, the limit switch $LS_3$ in this circuit being closed at this time. Energizing contactor A closes contacts $A_1$ and $A_2$ to establish a holding circuit for contactor A through contacts $A_1$. Contacts $A_2$ establish a circuit through the latch solenoid $S_3$ to energize the same and withdraw the latch-bolt from the turret. This operation will occur if the pelleting ram 55 is in its full retracted position to close the limit switch $LS_1$.

Energizing the latch-bolt solenoid $S_3$ causes movement of the bolt 41 to strike the limit switch $LS_2$, which limit switch establishes a circuit through the electric motor 40 to begin indexing of the turret 30. When the turret approaches the end of a 90-degree indexing motion, limit switch $LS_3$ will be engaged by the cam 165 to open the same and thereby de-energize contactor A which opens contacts $A_1$ and $A_2$ to break the holding circuit through the contactor A and the circuit through the latch solenoid $S_3$. This permits the latchbolt 41 to ride upon the turret, but without opening limit switch $LS_2$ so that the indexing motor 40 continues the indexing motion of the turret until the latch bolt 41 drops into the next latch opening.

When the latch-bolt 41 drops into the next latch opening, which indicates a 90-degree index of the turret 30, limit switch $LS_4$ is closed, which limit switch, as indicated in Figure 16, is provided with double contacts to cause energization of two parts of the circuit as selected by the limit switches $LS_5$ and $LS_6$.

Assuming that limit switch $LS_5$ is engaged by a cam 166 to close the same upon completion of the turret indexing, the closing of limit switch $LS_4$ will thereby energize contactor B to close contacts $B_1$ and $B_2$ and initiate the first phase of the cycle of the operation of the press that includes pelleting or compressing of the plastic material and heating of a charge of plastic material.

Closing of contacts $B_1$ forms a holding circuit for contactor B while closing of contacts $B_2$ establishes a circuit through the solenoids $S_1$ and $S_2$ operating the 4-way valves 80 and 81 to advance the rams 47 and 55 toward one another to compress a pellet or charge of plastic material in the feeding chamber 60. Simultaneously therewith, solenoids $S_7$ and $S_8$ are energized to place the electrodes 66 and $66a$ in engagement with the charge of plastic material that is contained in the material-receiving chamber 35 at station A of the turret to heat the plastic material therein.

When contacts $B_2$ were closed, a timer T started its cycle of operation to time the heating cycle of the plastic material. As soon as the timer T runs its cycle, contacts $T_1$ are closed to again initiate energization of contactor A to actuate the latch solenoid $S_3$. However, when contactor A is energized, contacts $A_3$ are opened to de-energize contactor B and thus de-energize solenoids $S_1$, $S_2$, $S_7$ and $S_8$ to stop the heating cycle and retract the rams 47 and 55. As soon as the ram 55 reaches the end of its retraction stroke, limit switch $LS_1$ is closed to permit completion of the circuit through the latch solenoid $S_3$ and thereby retract the latch bolt 41.

As soon as latch-bolt 41 is retracted, limit switch $LS_2$ is closed to again initiate operation of the indexing motor 40 to index the turret 90 degrees. As the turret indexes, limit switch $LS_4$ is again closed when the latch-bolt 41 drops into the next latch-bolt opening.

At this time the turret will have indexed 90 degrees so that the cam $166a$ will now contact limit switch $LS_6$ to initiate the second phase of the cycle of operation of the machine that includes injection of the plastic material from a chamber in the turret and insertion of the previously pre-compressed charge of plastic material. When limit switch $LS_6$ is closed a circuit is made through contactor C. Contacts $C_1$ form a holding circuit for contactor C, while contacts $C_2$ form a circuit through the solenoid $S_4$ to cause operation of the hydraulic motor 16 to close the mold and clamp the same upon the stationary mold.

Simultaneously with closing of contacts $C_1$ and $C_2$, contacts $C_3$ are closed and contacts $C_4$ are opened. Closing of contacts $C_3$ establishes a circuit through solenoid $S_2$ to again initiate operation of hydraulic motor 50 to cause insertion of the previously precompressed pellet into a turret chamber. Contacts $C_4$ are opened to de-energize the circuits to solenoids $S_1$, $S_7$ and $S_8$ to prevent operation of the hydraulic motor 45 and the solenoids $S_7$ and $S_8$ for the electrodes 66 and $66a$.

When the hydraulic motor 16 closes the molds the tonnage control $TC_1$ closes a circuit through a contactor D when a predetermined pressure is reached in the hydraulic motor 16 to close contacts $D_1$ and $D_2$. Closing contacts $D_1$ establishes a holding circuit through contactor D and closing contacts $D_2$ establishes a circuit through solenoid $S_5$ to operate the 4-way valve 79 and begin operation of the hydraulic motor 25 to move the injection plunger 22 through the turret 30 to transfer plastic material from the turret chamber into the injection cylinder and eject the plastic material therefrom.

The injection plunger 22 moves forward until a predetermined pressure is reached in the hydraulic motor 25, at which time tonnage control $TC_2$ closes a circuit through contactor E that closes contacts $E_1$ and $E_2$. Closing the contacts $E_1$ establishes a holding circuit through contactor E while closing contacts $E_2$ establishes a circuit through a timer $T_2$ for timing the completion of the injection cycle and the time at which the injection plunger shall be retracted and the molds opened.

As timer $T_2$ runs its cycle, contacts $T_{2a}$ are opened thereby de-energizing contactor D to open contacts $D_1$ and $D_2$ to de-energize solenoid $S_5$ and thereby permit the 4-way valve 79 to be returned to its initial position to place the hydraulic motor 25 on a retraction stroke.

Subsequently, timer $T_2$ opens contacts $T_{2b}$ thereby de-energizing contactor C to open contacts $C_1$ and $C_2$ which de-energize solenoid $S_4$ to permit the 4-way control valve 78 to return to its normal position and cause the hydraulic motor 16 to retract and open the molds.

Subsequently, contacts $T_{2c}$ are closed to again establish a circuit through contactor A and reinitiate an automatic cycle of operation of the injection machine.

A selector switch 168 is provided for selecting between automatic or semi-automatic operation of the machine. If the switch 168 is closed the machine will operate on an automatic cycle of operation, and if open, will operate on a semi-automatic cycle of operation.

While the apparatus disclosed and described herein constitutes a preferred form of the invention, yet modifications of the apparatus can be made without departing from the spirit of the invention, and all modifications that fall within the scope of the appended claims are intended to be included herein.

Having thus fully described my invention, what I claim as new and desire to secure by Letters Patent is:

1. A turret injection machine that includes in combination, an injection cylinder providing an injection station, a plastic material feeding mechanism providing a feeding station, a rotatably mounted turret having a plurality of unheated material-receiving chambers therein constructed of electrical insulating material, means rotatably mounting said turret for rotation between said injection station and said feeding station to provide for movement of said chambers from the feeding station to the injection station, means for intermittently rotating said turret to place said chambers at said stations, an injection plunger movable through said material-receiving chambers in said turret to transfer plastic material therefrom into said injection cylinder, and electrode means positioned in alignment on opposite sides of the turret for establishing a field of high frequency energy within said material-receiving chambers in said turret when said chambers are in a stationary position between the feeding station and the injection station.

2. A turret injection machine that includes in combination, an injection cylinder forming an injection station and having an injection plunger associated therewith, an intermittently rotatable turret rotatably mounted adjacent said injection cylinder and having a plurality of unheated material-receiving chambers therein, a feeding mechanism for feeding plastic material into said material-receiving chambers, said material-receiving chambers in said turret being constructed of electrical insulating material, and electrode means positioned in alignment on opposite sides of the turret for producing a field of high frequency energy within said material-receiving chambers to heat plastic material therein when said chambers are in a stationary position to thereby provide a heating station.

3. A turret injection machine that includes in combination, an injection cylinder forming an injection station and having an injection plunger associated therewith, a turret rotatably mounted adjacent said injection cylinder and having a plurality of unheated material-receiving chambers therein, a feeding mechanism for feeding plastic material into said material-receiving chambers, said material-receiving chambers in said turret being constructed of electrical insulating material, and electrode means positioned in alignment on opposite sides of the turret for producing a field of high frequency energy within said material-receiving chambers to heat plastic material therein, said heating means being stationarily positioned adjacent the periphery of the turret at a point substantially mid-way between the location of the feeding mechanism and the injection cylinder.

4. A turret injection machine that includes in combination, an injection cylinder, a turret rotatably mounted adjacent said injection cylinder and including a plurality of unheated material-receiving chambers therein for sequential alignment with said injection cylinder, said material-receiving chambers in said turret being constructed of electrical insulating material, an injection plunger movable through said material-receiving chambers to transfer plastic material from the chambers into the injection cylinder without placing the chambers under any substantial pressure, a feeding mechanism for feeding plastic material into said material-receiving chambers, and electrode means disposed adjacent opposite ends of one of the material-receiving chambers and adapted to be connected to a source of high frequency current when other of said material-receiving chambers are stationarily positioned in operative position adjacent the feeding means and the injecting means to thereby heat the plastic material in the material-receiving chambers before transfer thereof from the material-receiving chambers into the injection cylinder by said injection plunger.

5. A turret injection machine that includes in combination, an injection cylinder, a turret rotatably mounted adjacent said injection cylinder and including a plurality of material-receiving chambers therein for sequential alignment with said injection cylinder, said material-receiving chambers in said turret being constructed of electrical insulating material, an injection plunger movable through said material-receiving chambers to transfer plastic material from the chambers into the injection cylinder without placing the chambers under any substantial pressure, a feeding mechanism for feeding plastic material into said material-receiving chambers, electrode means disposed adjacent opposite ends of one of the material-receiving chambers and adapted to be connected to a source of high frequency current when other of said material-receiving chambers are stationarily positioned in operative position adjacent the feeding means and the injecting means to thereby heat the plastic material in the material-receiving chambers before transfer thereof from the material-receiving chambers into the injection cylinder by said injection plunger, and an indexing mechanism for sequentially indexing said turret to selected stationary positions to place the material-receiving chambers sequentially in position to receive plastic material from the feeding mechanism, in position for causing establishment of the high frequency field within the material-receiving chambers for heating the material, and in position in alignment with the injection cylinder and the plunger associated therewith for transfer of the plastic material into the injection cylinder.

6. A turret injection machine that includes in combination, an injection cylinder providing an injection station, a feeding chamber providing a feeding station, a turret having a plurality of material-receiving chambers therein and rotatably disposed between said injection cylinder and said feeding chamber to transfer plastic material from the feeding chamber to the injection cylinder, plunger means for compressing plastic material in said feeding chamber and for transferring the compressed material into said material-receiving chambers in said turret, and plunger means associated with said injection cylinder for transferring plastic material from said material-receiving chambers in said turret into said injection cylinder and to eject plastic material therefrom.

7. A turret injection machine that includes in combination, an injection cylinder providing an injection station, a feeding chamber providing a feeding station, a turret having a plurality of material-receiving chambers therein and rotatably disposed between said injection cylinder and said feeding chamber to transfer plastic material from the feeding chamber to the injection cylinder, plunger means for compressing plastic material in said feeding chamber and for transferring the compressed material into said material-receiving chambers in said turret, and plunger means associated with said injection cylinder for transferring plastic material from said material-receiving chambers in said turret into said injection cylinder and to eject plastic material therefrom, both of the said plunger means being movable through the material-receiving chambers in said turret to produce pressure upon the plastic material externally of the turret.

8. A turret injection machine that includes in combination, an injection cylinder providing an injection station, a feeding chamber providing a feeding station, a turret having a plurality of material-receiving chambers therein and rotatably disposed between said injection cylinder and said feeding chamber to transfer plastic material from the feeding chamber to the injection cylinder, a plunger means for compressing plastic material in said feeding chamber and for transferring the compressed material into said material-receiving chambers in said turret, plunger means associated with said injection cylinder for transferring plastic material from said material-receiving chambers in said turret into said injection cylinder and to eject plastic material therefrom, and heating means positioned between the feeding chamber and the injection cylinder in the direction of rotation of the turret when moving the material-receiving chambers from the feeding chamber to the injection cylinder for heating plastic material in the material-receiving chambers when positioned adjacent said heating means.

9. A turret injection machine that includes in combination, an injection cylinder providing an injection station, a feeding chamber providing a feeding station, a turret having a plurality of material-receiving chambers therein and rotatably disposed between said injection cylinder and said feeding chamber to transfer plastic material from the feeding chamber to the injection cylinder, plunger means for compressing plastic material in said feeding chamber and for transferring the compressed material into said material-receiving chambers in said turret, plunger means associated with said injection cylinder for transferring plastic material from said material-receiving chambers in said turret into said injection cylinder and to eject plastic material therefrom, and electrode means adapted to be connected to a source of high frequency current for establishing a field of high frequency energy therebetween and within said material-receiving chambers in said turret and providing a heating station positioned between the feeding chamber and the injection chamber for heating plastic material in the material-receiving chambers when positioned adjacent said heating means.

10. A turret injection machine that includes in combination, an injection cylinder, a feeding chamber adjacent said injection cylinder, a turret rotatably disposed between said injection cylinder and said feeding chamber and having a plurality of material-receiving chambers movable into position adjacent said feeding chamber and into alignment with said injection cylinder, plunger means movable through said material-receiving chambers into said feeding chamber for compressing plastic material in the feeding chamber and for moving the compressed plastic material into a material-receiving chamber in the turret, means for establishing a field of high frequency energy in said material-receiving chambers when said chambers are positioned between said feeding chamber and said injection cylinder in the direction of rotation of the turret from the feeding chamber to the injection cylinder, and plunger means movable through said material-receiving chambers when in alignment with said injection cylinder for transferring heated and compressed plastic material from the material-receiving chamber in the turret into said injection cylinder and for producing pressure in the injection cylinder to eject the plastic material therefrom.

11. A turret injection machine that includes in combination, means forming an injection station consisting of an injection cylinder and an injection plunger co-operating therewith, means forming a feeding station consisting of a feeding mechanism for feeding plastic material, a turret, means forming a heating station consisting of electrode means positioned in alignment on opposite sides of said turret, said turret having material-receiving chambers therein constructed of electrical insulating material, said turret being rotatably disposed for indexing said chambers between said feeding station, said heating station and said injection station sequentially, and means for indexing said turret, said electrode means being adapted for connection to a source of high frequency current when said turret is stationary for establishing a field of high frequency energy between the electrodes.

12. A turret injection machine that includes in combination, an injection cylinder, a turret having a plurality of material-receiving chambers, means adjacent said injection cylinder rotatably supporting said turret for positioning the material-receiving chambers thereof in alignment with said injection cylinder, a pre-compressing chamber disposed adjacent said turret in alignment with one of said material-receiving chambers when another of the material-receiving chambers is in alignment with said injection cylinder, plunger means movable through a material-receiving chamber into said pre-compressing chamber forming an end wall thereof, a second plunger means movable in said pre-compressing chamber to pre-compress plastic material between the first and second plunger means and for moving the pre-compressed plastic material into the material-receiving chamber, and injection plunger means movable through a material-receiving chamber to transfer pre-compressed plastic material therefrom into said injection cylinder and for producing pressure thereon to eject plastic material therefrom.

13. A turret injection machine that includes in combination, an injection cylinder, a turret having a plurality of material-receiving chambers, means adjacent said injection cylinder rotatably supporting said turret for positioning the material-receiving chambers thereof in alignment with said injection cylinder, a pre-compressing chamber disposed adjacent said turret in alignment with one of said material-receiving chambers when another of the material-receiving chambers is in alignment with said injection cylinder, plunger means movable through a material-receiving chamber into said pre-compressing chamber forming an end wall thereof, a second plunger means movable in said pre-compressing chamber to pre-compress plastic material between the first and second plunger means and for moving the pre-compressed plastic material into the material-receiving chamber, injection plunger means movable through a material-receiving chamber to transfer pre-compressed plastic material therefrom into said injection cylinder and for producing pressure thereon to eject plastic material therefrom, said material-receiving chambers being constructed of electrical insulating material, and electrode means adapted to be connected to a source of high frequency current for establishing a field of high frequency energy within said material-receiving chambers when said chambers are positioned between said pre-compressing chamber and said injection cylinder in the direction of rotation therebetween.

14. A turret injection machine that includes in combination, an injection cylinder, a turret having a plurality of material-receiving chambers therein, means disposed adjacent said injection cylinder for rotatably supporting said turret to position said material-receiving chambers in alignment with said injection cylinder, a feeding chamber positioned relative to said injection cylinder for alignment with one of said material-receiving chambers when another of the material-receiving chambers is in alignment with said injection cylinder, wall means positioned adjacent said turret to retain plastic material within said material-receiving chambers while said turret is rotating from the feeding chamber to the injection cylinder, and an injection plunger positioned in alignment with said injection cylinder, said wall means having an opening therethrough in alignment with the injection plunger, said injection plunger being movable into the injection cylinder through said turret and said wall means for transfer of plastic material from the material-receiving chamber into said injection cylinder and for ejection of plastic material from the injection cylinder.

15. A turret injection machine that includes in combination, an injection cylinder, a turret having a plurality of material-receiving chambers therein, means disposed adjacent said injection cylinder for rotatably supporting said turret to position said material-receiving chambers in alignment with said injection cylinder, a feeding chamber positioned relative to said injection cylinder for alignment with one of said material-receiving chambers when another of the material-receiving chambers is in alignment with said injection cylinder, wall means positioned adjacent said turret to retain plastic material within said material-receiving chambers while said turret is rotating from the feeding chamber to the injection cylinder, an injection plunger positioned in alignment with said injection cylinder, said wall means having an opening therethrough in alignment with the injection plunger, said injection plunger being movable into the injection cylinder through said turret and said walls means for transfer of plastic material from the material-receiving chamber into said injection cylinder and for ejection of plastic material from the injection cylinder, and electrode means positioned adjacent opposite ends of said material-receiving chambers for establishing a field of high frequency energy within said material-receiving chambers when the said chambers are positioned between the feeding chamber and the injection chamber in the direction of rotation therebetween.

16. A turret injection machine that includes in combination, an injection cylinder, a turret having a plurality of material-receiivng chambers therein, means disposed adjacent said injection cylinder for rotatably supporting said turret to position said material-receiving chambers in alignment with said injection cylinder, a feeding chamber positioned relative to said injection cylinder for alignment with one of said material-receiving chambers when another of the material-receiving chambers is in alignment with said injection cylinder, wall means positioned adjacent said turret to retain plastic material within said material-receiving chambers while said turret is rotating from the feeding chamber to the injection cylinder, an injection plunger positioned in alignment with said injection cylinder said wall means having an opening therethrough in alignment with the injection plunger, said injection plunger being movable into the injection cylinder through said turret and said wall means for transfer of plastic material from the material-receiving chamber into said injection cylinder and for ejection of plastic material from the injection cylinder, and electrode means positioned in said wall means and adapted to be connected to a source of high frequency current for establishing a field of high frequency energy within said chambers when positioned between said feed chamber and said injection cylinder in the direction of rotation therebetween.

17. The structure set forth in claim 18 having electrode means positioned in opposite ends of said material receiving chambers in the form of peripheral rings, contact means in said wall means for engagement with said peripheral rings to thereby connect said electrode means with a source of high frequency current when said material receiving chambers are disposed between said feding chamber and said injection cylinder in the direction of rotation therebetween.

18. A turret injection machine that includes in combination, an injection cylinder, a turret having a plurality of material-receiving chambers therein, means disposed adjacent said injection cylinder for rotatably supporting said turret upon a horizontal axis to position said material-receiving chambers in alignment with said injection cylinder, a feeding chamber positioned relative to said injection cylinder for alignment with one of said material-receiving chambers when another of the material-receiving chambers is in alignment with said injection cylinder, wall means positioned adjacent both sides of said turret to retain plastic material within said material-receiving chambers while said turret is rotating from the feeding chamber to the injection cylinder, an injection plunger positioned in alignment with said injection cylinder, said wall means having an opening therethrough in alignment with the injection plunger, said injection plunger being movable into the injection cylinder through said turret and said wall means for transfer of plastic material from the material-receiivng chamber into said injection cylinder and for ejection of plastic material from the injection cylinder.

19. A turret injection machine that includes in combination, an injection cylinder, a turret having a plurality of material-receiving chambers therein, means disposed adjacent said injection cylinder for rotatably supporting said turret upon a vertical axis to position said material-receiving chambers in alignment with said injection cylinder a feeding chamber positioned relative to said injection cylinder for alignment with one of said material-receiving chambers when another of the material-receiving chambers is in alignment with said injection cylinder, wall means positioned adjacent the bottom side of said turret to retain plastic material within said material-receiving chambers while said turret is rotating from the feeding chamber to the injection cylinder, and an injection plunger positioned in alignment with said injection cylinder, said wall means having an opening in alignment with the injection plunger, said injection plunger being movable into the injection cylinder through said turret and said wall means for transfer of plastic material from the material-receiving chamber into said injection cylinder and for ejection of plastic material from the injection cylinder.

20. A turret injection machine including in combination; an injection cylinder, an injection plunger operably associated with said cylinder, a mould closing means, a turret rotatably disposed adjacent said cylinder having a plurality of material-receiving chambers therein for alignment with the injection cylinder upon indexing of the turret, means for precompressing a charge of plastic material and for transferring the pre-compressed charge into a material-receiving chamber in said turret, and electrode means adapted to be connected to a source of high frequency current movable into engagement with plastic material in the material-receiving chambers of the turret for heating plastic material therein, means for unlatching said turret to permit rotation thereof including means responsive to the unlatching of the turret for actuating means to index the turret, means responsive to rotation of said turret at the end of the indexing motion thereof for activating the means for pre-compressing a charge of plastic material and the means for heating a charge of plastic material, means for regulating the heating period of the plastic material and for reactivating the means to unlatch the turret upon completion of the heating period for a second indexing of the turret, and means responsive to rotation of the turret on completion of the indexing motion that is independent of the first so mentioned means for activating the means for clamping the moulds together, for reactivating the means that compresses the plastic material to cause operation thereof to insert the previously compressed plastic material into a material-receiving chamber in the turret, and for activating the injection plunger for ejecting plastic material from the injection cylinder.

21. A turret injection machine including in combination, an injection cylinder, an injection plunger operably associated with said cylinder, a mould closing means, a turret rotatably disposed adjacent said cylinder having a plurality of material-receiving chambers therein for alignment with the injection cylinder upon indexing of the turret, means for pre-compressing a charge of plastic material and for transferring the pre-compressed charge into a material-receiving chamber in said turret, and electrode means adapted to be connected to a source of high frequency current movable into engagement with plastic material in the material-receiving chambers of the turret for heating plastic material therein, means for unlatching said turret to permit rotation thereof including means responsive to the unlatching of the turret for actuating means to index the turret, means responsive to rotation of said turret at the end of the indexing motion thereof for activating the means for pre-compressing a charge of plastic material and the means for heating a charge of plastic material, means for regulating the heating period of the plastic material and for reactivating the means to unlatch the turret upon completion of the heating period for a second indexing of the turret, and means responsive to rotation of the turret on completion of the indexing motion that is independent of the first so mentioned means for activating the means for clamping the molds together, for reactivating the means that compresses the plastic material to cause operation thereof to insert the previously compressed plastic material into a material-receiving chamber in the turret, and for activating the injection plunger for ejecting plastic material from the injection cylinder, and means for regulating the period of activation of the injection plunger and for re-initiating operation of the means for unlatching the turret to restart another cycle of operation of the injection machine automatically.

22. A turret injection machine including in combination, an injection cylinder, an injection plunger operably associated with said cylinder, a mould closing means, a turret rotatably disposed adjacent said cylinder having a plurality of material-receiving chambers therein for alignment with the injection cylinder upon indexing of the turret, means for pre-compressing a charge of plastic material and for transferring the pre-compressed charge into a material-receiving chamber in said turret, and electrode means adapted to be connected to a source of high frequency current movable into engagement with plastic material in the material-receiving chambers of the turret for heating plastic material therein, means for unlatching said turret to permit rotation thereof including means responsive to the unlatching of the turret for actuating means to index the turret, means responsive to rotation of said turret at the end of the indexing motion thereof for activating the means for pre-compressing a charge of plastic material and the means for heating a charge of plastic material, means for regulating the heating period of the plastic material and for reactivating the means to unlatch the turret upon completion of the heating period for a second indexing of the turret, means responsive to rotation of the turret on completion of the indexing motion that is independent of the first so mentioned means for activating the means for clamping the molds together, for reactivating the means that compresses the plastic material to cause operation thereof to insert the previously compressed plastic material into a material-receiving chamber in the turret, and for activating the injection plunger for ejecting plastic material from the injection cylinder, means for regulating the period of activation of the injection plunger and for re-initiating operation of the means for unlatching the turret to restart another cycle of operation of the ejection machine automatically, and means for rendering said last-mentioned means inactive for restarting the cycle of operation of the machine to thereby place the same on a semi-automatic cycle of operation.

23. A turret injection machine including in combination, an injection cylinder, an injection plunger operably associated with said cylinder, a mold closing means, a turret rotatably disposed adjacent said cylinder having a plurality of material-receiving chambers therein for alignment with the injection cylinder upon indexing of the turret, means for pre-compressing a charge of plastic material and for transferring the pre-compressed charge into a material-receiving chamber in said turret, an electrode means adapted to be connected to a source of high frequency current movable into engagement with plastic material in the material-receiving chambers of the turret for heating plastic material therein, means for electrically actuating the means for unlatching said turret to permit rotation thereof and including electric switch means actuated by the unlatching of the latching mechanism for initiating operation of the means for indexing the turret, an electric switch means actuated by rotation of the turret upon completion of the indexing motion thereof for activating the means for compressing a charge of plastic material and the means for heating the charge of plastic material together with timing means for timing the heating period, said timing means including means for reactivating the means for unlatching said turret to initiate a second indexing motion thereof, and an electric switch means operated by movement of said turret upon completion of the indexing motion thereof that is independent from the first of so mentioned means for activating the means for closing the moulds, for reactivating the means that compresses the plastic material to cause operation thereof to insert the previously compressed charge of plastic material into a material-receiving chamber in the turret, and to activate the injection plunger so as to perform an injection operation.

24. A turret injection machine including in combination, an injection cylinder, an injection plunger operably associated with said cylinder, a mould closing means, a turret rotatably disposed adjacent said cylinder having a plurality of material-receiving chambers therein for alignment with the injection cylinder upon indexing of the turret, means for pre-compressing a charge of plastic material and for transferring the pre-compressed charge into a material-receiving chamber in said turret, an electrode means adapted to be connected to a source of high frequency current movable into engagement with plastic material in the material-receiving chambers of the turret for heating plastic material therein, means for electrically actuating the means for unlatching said turret to permit rotation thereof and including electric switch means actuated by the unlatching of the latching mechanism for initiating the means for indexing the turret, an electric switch means actuated by rotation of the turret upon completion of the indexing motion thereof for activating the means for compressing a charge of plastic material and the means for heating the charge of plastic material together with timing means for timing the heating period, said timing means including means for reactivating the means for unlatching said turret to initiate a second indexing motion thereof, an electric switch means operated by movement of said turret upon completion of the indexing motion thereof that is independent from the first of so mentioned switch means for activating the means for closing the molds, for reactivating the means that compresses the plastic material to cause operation thereof to insert the previously compressed charge of plastic material into a material-receiving chamber in the turret, and to activate the injection plunger so as to perform an injection operation, and timing means activated by the last-mentioned switch means for regulating the period of the injection operation of the injection plunger and for reactivating the means for unlatching the turret to restart another cycle of operation of the injection machine automatically.

25. A turret injection machine that includes in combination, an injection cylinder providing an injection station, a plastic material feeding mechanism positioned adjacent said injection cylinder and providing a feeding station, an intermittently movable turret having metal walls receiving a plurality of material-receiving chambers therein constructed from electrical insulating material that is not heated to any substantial degree when placed in a field of high frequency energy and rotatably mounted adjacent said injection cylinder, means positioned between said injection station and said feeding station upon which said turret is rotatably mounted thereby carrying plastic material from the feeding station to the injection station, an injection plunger movable through said material-receiving chambers in said turret to transfer plastic material therefrom into said injection cylinder, and electrode means positioned in alignment on opposite sides of the turret for establishing a field of high frequency energy within said material-receiving chambers in said turret when said chambers are in a stationary position between the feeding station and the injection station.

26. A turret injection machine that includes in combination, an injection cylinder, an intermittently movable metal turret rotatably mounted adjacent said injection cylinder and having a plurality of material-receiving chambers therein for sequential alignment with said injection cylinder, said material-receiving chambers in said turret being constructed of electrical insulating material that is not heated readily when in a field of high frequency energy, an injection plunger movable through said material-receiving chambers to transfer plastic material from the chambers into the injection cylinder without placing the chambers under any substantial pressure, a feeding mechanism for feeding plastic material into said material-receiving chambers, and electrode means disposed adjacent opposite ends of the material-receiving chambers and adapted to be connected to a source of high frequency current when said material-receiving chambers are stationarily positioned between the feeding means and the injecting means upon indexing motion of the turret to thereby heat the plastic material in the material-receiving chambers at a heating station before transfer thereof from the material-receiving chambers by the injection plunger upon indexing of the turret to place the material-receiving chamber in alignment with the injection cylinder.

27. A turret injection machine that includes in combination, an injection cylinder providing an injection station, a plastic material feeding means disposed adjacent said injection cylinder forming a feeding station, electrode means adapted to be connected to a source of high frequency current forming a heating station and disposed between said feeding station and said injection station, a rotatable turret having metal walls containing a plurality of material-receiving chambers formed of electrical insulating material that is not readily heated when in a field of high frequency energy and positioned upon said turret so as to dispose a material-receiving chamber adjacent said injection station, said feeding station and said heating station simultaneously, means for compressing a charge of plastic material at said feeding station for subsequent heating at said heating station upon being transferred thereto from the feeding station to the heating station, means for indexing the turret to sequentially place the material-receiving chambers at the feeding station, the heating station and the injection station, and means for ejecting plastic material from the turret at the injection station.

HOWARD F. MacMILLIN.

REFERENCES CITED

The following references are of record in the file of this patent:

UNITED STATES PATENTS

| Number | Name | Date |
|---|---|---|
| 1,597,803 | Kearney et al. | Aug. 31, 1926 |
| 2,179,261 | Keller | Nov. 7, 1939 |
| 2,287,277 | Ryder | June 23, 1942 |
| 2,356,338 | Misfeldt | Aug. 22, 1944 |

FOREIGN PATENTS

| Number | Country | Date |
|---|---|---|
| 851,723 | France | Oct. 9, 1939 |